US008250974B2

(12) United States Patent
Polato

(10) Patent No.: US 8,250,974 B2
(45) Date of Patent: Aug. 28, 2012

(54) APPARATUS FOR APPLYING OSCILLATING ELECTROMAGNETIC FIELDS, PARTICULARLY FOR TREATING LIQUID, PASTY, SEMI-SOLID OR GRANULAR PRODUCTS, AND METHOD OF USE OF SUCH APPARATUS AND SYSTEM INCORPORATING SAME

(75) Inventor: Antonio Polato, Marostica (IT)

(73) Assignee: Officine di Cartigliano SpA, Cartigliano (IT)

( * ) Notice: Subject to any disclaimer, the term of this patent is extended or adjusted under 35 U.S.C. 154(b) by 583 days.

(21) Appl. No.: 11/917,379

(22) PCT Filed: Mar. 10, 2006

(86) PCT No.: PCT/IB2006/000529
§ 371 (c)(1),
(2), (4) Date: Oct. 29, 2009

(87) PCT Pub. No.: WO2006/136882
PCT Pub. Date: Dec. 28, 2006

(65) Prior Publication Data
US 2010/0037784 A1  Feb. 18, 2010

(30) Foreign Application Priority Data
Jun. 21, 2005 (IT) .............................. VI2005A0179

(51) Int. Cl.
*A23L 3/28* (2006.01)
*A23L 3/00* (2006.01)
(52) U.S. Cl. .............. 99/358; 99/451; 99/483; 426/238; 426/241; 426/407; 422/22

(58) Field of Classification Search .................... 99/358, 99/451, 483, DIG. 14; 426/238, 237, 234, 426/241, 247, 407, 521; 422/22, 23, 24; 219/700, 735
See application file for complete search history.

(56) References Cited

U.S. PATENT DOCUMENTS

| 4,169,029 A | | 9/1979 | Smirnov | |
| 4,723,483 A | * | 2/1988 | Papchenko et al. | 99/451 |
| 5,690,978 A | | 11/1997 | Yin | |
| 5,834,746 A | * | 11/1998 | Pedersen et al. | 219/771 |
| 6,086,932 A | * | 7/2000 | Gupta | 426/237 |

(Continued)

FOREIGN PATENT DOCUMENTS

DE  1010201  6/1957

(Continued)

*Primary Examiner* — Reginald L Alexander
(74) *Attorney, Agent, or Firm* — Themis Law

(57) ABSTRACT

The invention relates to an apparatus for applying oscillating magnetic fields, particularly for treating liquid, pasty, semi-solid or granular products, to a method of use of such apparatus, and to a system incorporating it. The apparatus comprises at least one pipe of an electrically insulating material for conveying the products to be treated, at least one plurality of electrodes around the periphery of the pipe, and means for generating one high frequency oscillating electric voltage. Each of the electrodes has a substantially annular shape, with an inner surface having a minimum radial distance from the outer cylindrical surface of the at least one pipe, which is sufficient to prevent electric currents from passing to the product to be treated. The inner surface has at least one substantially conical edge with a predetermined conicity angle to allow use of relatively high voltages with no risk of discharges to air.

24 Claims, 3 Drawing Sheets

U.S. PATENT DOCUMENTS

| | | |
|---|---|---|
| 6,110,423 A * | 8/2000 | Bushnell et al. ............... 422/23 |
| 6,178,880 B1 | 1/2001 | Mastwijk |
| 6,231,908 B1 * | 5/2001 | Lelieveld et al. ............ 426/237 |
| 7,328,653 B2 * | 2/2008 | Tonello ........................... 99/451 |
| 2001/0013467 A1 | 8/2001 | De Jong |
| 2005/0028679 A1 * | 2/2005 | Williamson .................... 99/451 |

FOREIGN PATENT DOCUMENTS

| | | |
|---|---|---|
| DE | 4112383 | 10/1992 |
| EP | 0457179 | 11/1991 |
| EP | 1198997 | 4/2002 |
| GB | 598486 | 2/1948 |
| WO | 03101153 | 12/2003 |

* cited by examiner

APPARATUS FOR APPLYING OSCILLATING ELECTROMAGNETIC FIELDS, PARTICULARLY FOR TREATING LIQUID, PASTY, SEMI-SOLID OR GRANULAR PRODUCTS, AND METHOD OF USE OF SUCH APPARATUS AND SYSTEM INCORPORATING SAME

FIELD OF THE INVENTION

The invention is applicable in the field of apparatus and systems for treatment of foods, and particularly relates to an apparatus for applying oscillating magnetic fields, particularly for treating liquid, pasty, semi-solid or granular products.

The invention further relates to a method of use of such apparatus and a system incorporating the method.

BACKGROUND OF THE INVENTION

Certain products, particularly fluid products, must undergo heat treatments for partly or wholly destroying the microbial population, thereby extending the shelf life of the product, i.e. the time corresponding, under predetermined conditions, to an acceptable reduction of the organoleptic quality of a product.

Such treatments stabilize the microbial count for a time that depends on the specific type of treatment, i.e. essentially on the selected time-to-temperature ratio.

On the one hand, a higher temperature is more effective in destroying the microbial flora, on the other hand an excessively long treatment time would tend to degrade most of the nutrients in the product, thereby reducing its organoleptic qualities. Thus, treatment times and temperatures have to be mutually adjusted to meet the combined needs of obtaining a quality product with an adequate shelf life.

Conventional treatments, such as sterilization, pasteurization, cooking or the like, cannot fulfill this need. Treatments range from "mild" treatments (low temperatures and long treatment times), which keep the organoleptic properties of the product substantially unaltered but involve a very short shelf life, to "strong" treatments (high temperature and short treatment times), providing a long shelf life but an unacceptably low organoleptic quality.

In an attempt to overcome these drawbacks, apparatus have been provided which tend to minimize the microbial count in the product at relatively low temperatures.

U.S. Pat. No. 2,550,584 discloses an apparatus for heat treatment of milk, which comprises a duct of non-electrically material, for receiving milk from an external tank and conveying it, a radio-frequency voltage generator and an applicator device having a plurality of annular electrodes connected in use to an oscillator to generate a radio frequency electromagnetic field therebetween. Two of these electrodes are at the same electric potential, to generate electric and magnetic components in a preferential direction, i.e. parallel to the axis of the pipe.

One drawback of this known solution is that an electric current passes through the milk, thereby tending to degrade the most valuable nutrients of the product to be treated, such as vitamins and proteins. Therefore, the resulting product exhibits poorer organoleptic properties. Furthermore, the milk that is treated by means of this apparatus tends to turn darker, due to the Maillard reaction, followed by enzymatic browning, with a consequent degradation of the properties of the product.

A further drawback is the excessive power consumption required to obtain a proper treatment of the product, because the product is generally heated unevenly, and very long treatment times are required for even heating.

Uneven heating also tends to create areas, in the product, in which the induced electromagnetic field has a higher intensity, and in which the product is subjected to degradation, thus strongly jeopardizing the organoleptic quality as a whole.

Also, relatively low power can only be used with such known system, and this adversely affects treatment times, leading to the above mentioned consequences.

From EP-A-1198997 a pulse sterilization apparatus is known. However, this apparatus also does not solve the aforementioned problems insofar as during use an electric current can pass through the product to be treated, thereby tending to degrade the most valuable nutrients thereof.

Other food product treatment apparatus are known from U.S. Pat. No. 5,690,978, US-A-2001/13467, WO 03/101153, DE-A-4112383, DE-A-1010201, EP-A-1000554, U.S. Pat. No. 4,169,029, GB-A-598486.

SUMMARY OF THE INVENTION

The object of this invention is to overcome the above drawbacks by providing an apparatus for applying oscillating electromagnetic fields that is highly efficient and relatively cost-effective.

A particular object is to provide an apparatus whereby a product of high organoleptic quality may be obtained.

A further object is to provide an apparatus that uses relatively high voltages in a simple and safe manner.

Yet another object of the invention is to provide a method that maximizes power efficiency and minimizes the processing costs for the product to be treated.

These objects, as well as other object that will be more apparent hereafter, are fulfilled by an apparatus for applying oscillating magnetic fields, which comprises at least one pipe for conveying the products to be treated, said pipe having an inner surface in contact with the product and a substantially cylindrical outer surface; at least one series of electrodes located around the outer periphery of said at least one pipe, each of said electrodes having a substantially annular shape and an inner surface with at least one substantially conical edge with a predetermined conicity angle; means for generating a high-frequency oscillating voltage, which are electrically connected to said at least one series of electrodes to generate an electromagnetic field therebetween, wherein each pipe is made of an electrically insulating material to prevent passage of current to the product, said high-frequency oscillating voltage being in the range of the radio-frequency, said inner surface of each said electrode being out of contact with the product to be treated and having a minimum radial distance from the outer cylindrical surface of said at least one pipe which is sufficient to prevent electric currents from passing to the product to be treated, during operation, and to heat the product exclusively by means of oscillation of the product molecules about their equilibrium points induced by said oscillating electromagnetic field, each pair of adjacent electrodes having facing conical edges with opposed conicity angles to induce electromagnetic field lines substantially parallel to the axis of the pipe and to allow use of high-frequency currents with no risk of air discharges.

Suitably, the minimum distance may be of 2 mm to 8 mm, and is preferably of about 5 mm.

The inner surface further has at least one tapered and conical edge, with a predetermined conicity angle. Advantageously, the predetermined conicity angle may be of 45° to 80°, and is preferably of about 60°.

Thanks to this configuration, the apparatus of the invention provides an end product having a dramatically higher organoleptic quality as compared with prior art apparatus.

By sizing the parts so that the minimum distance between the duct and the electrodes is sufficient to prevent electric currents from passing through the product to be treated, the product may be heated by the oscillating electromagnetic field only, thereby affording excellent advantages in terms of quality of the end product.

During treatment by the apparatus of the invention, easily degradable components are not exposed to excessive, uneven thermal shocks, therefore they can be heated without denaturation or parallel reactions.

For instance, if the apparatus is used for treating milk, the end product maintains its organoleptic properties unaltered, and has a bright, even color, showing that the Maillard reaction, typical of prior art systems, has not occurred.

Thanks to the conical taper of the inner edge of the electrodes, relatively high voltages may be used with no risk of discharges to air. The typical rectangular shape of the electrodes of prior art apparatus would tend to concentrate all the charge at the corners, thereby causing accumulation of point charge, ionization of air and formation of a voltaic arc, causing very serious effects on the mechanical stability of the assembly.

In addition to the conical taper, the annular shape and the size of the central electrode hole are of the utmost importance. In fact, by increasing the diameter of the hole, the value of the voltage discharged into the medium is also increased, as well as the potential difference required for arc formation. Furthermore, the curvature of the electric field lines, caused by the hole, further increases electric strength in the medium. This allows the use of higher power than with prior art apparatus, thereby reducing processing times and providing advantages in terms of both end quality of the product and cost-effectiveness of the process.

Advantageously, each of the annular electrodes may have two substantially conically shaped tapered inner edges having opposed conicity. Furthermore, the electrodes may be parallel and equally spaced. Preferably, to maintain the electrodes in equally spaced positions, the present apparatus may have at least one electrically insulating spacer member.

Thus, the electromagnetic field lines will tend to be substantially parallel to the axis of the duct, to maximize its efficiency in terms of thermal energy released. Furthermore, this configuration minimizes undesired edge effects, which dissipate the field in areas in which the product is not present.

In order to further prevent any point charge accumulation, the inner annular edge of each electrode may have a substantially cylindrical central portion interposed between the substantially tapered edges, thereby forming a truncated cone shape. For the same reason, the connection areas between the substantially cylindrical portion and the substantially conical edges may be joined with a radius of curvature of 1.5 mm to 3 mm, preferably of about 2 mm.

Advantageously, the electrodes of adjacent series may be electrically interconnected by flexible conductors to follow any thermal expansion of their respective ducts, thereby preventing any inclination or breakage of the mechanical parts.

Conveniently, this at least one duct is connected to respective inlet and outlet pipes by connection joints that are resilient in the longitudinal direction to fit any thermal expansion thereof.

In another aspect of the invention, a plant is provided for applying oscillating electromagnetic fields, which comprises a tank for the product to be treated, means for heating the product, and means for conveying the product from the tank to the heating means.

According to the invention, the heating means comprise an apparatus for applying oscillating electromagnetic fields as disclosed and claimed herein.

According to another aspect of the invention there is provided a method of use of the above apparatus for applying oscillating electromagnetic fields.

BRIEF DESCRIPTION OF THE DRAWINGS

Further features and advantages of the invention will be more apparent from the detailed description of a preferred, non-exclusive embodiment of an apparatus according to the invention, which is described by way of non-limiting example with the help of the annexed drawings, in which.

DETAILED DESCRIPTION OF A PREFERRED EMBODIMENT

Figure 1:
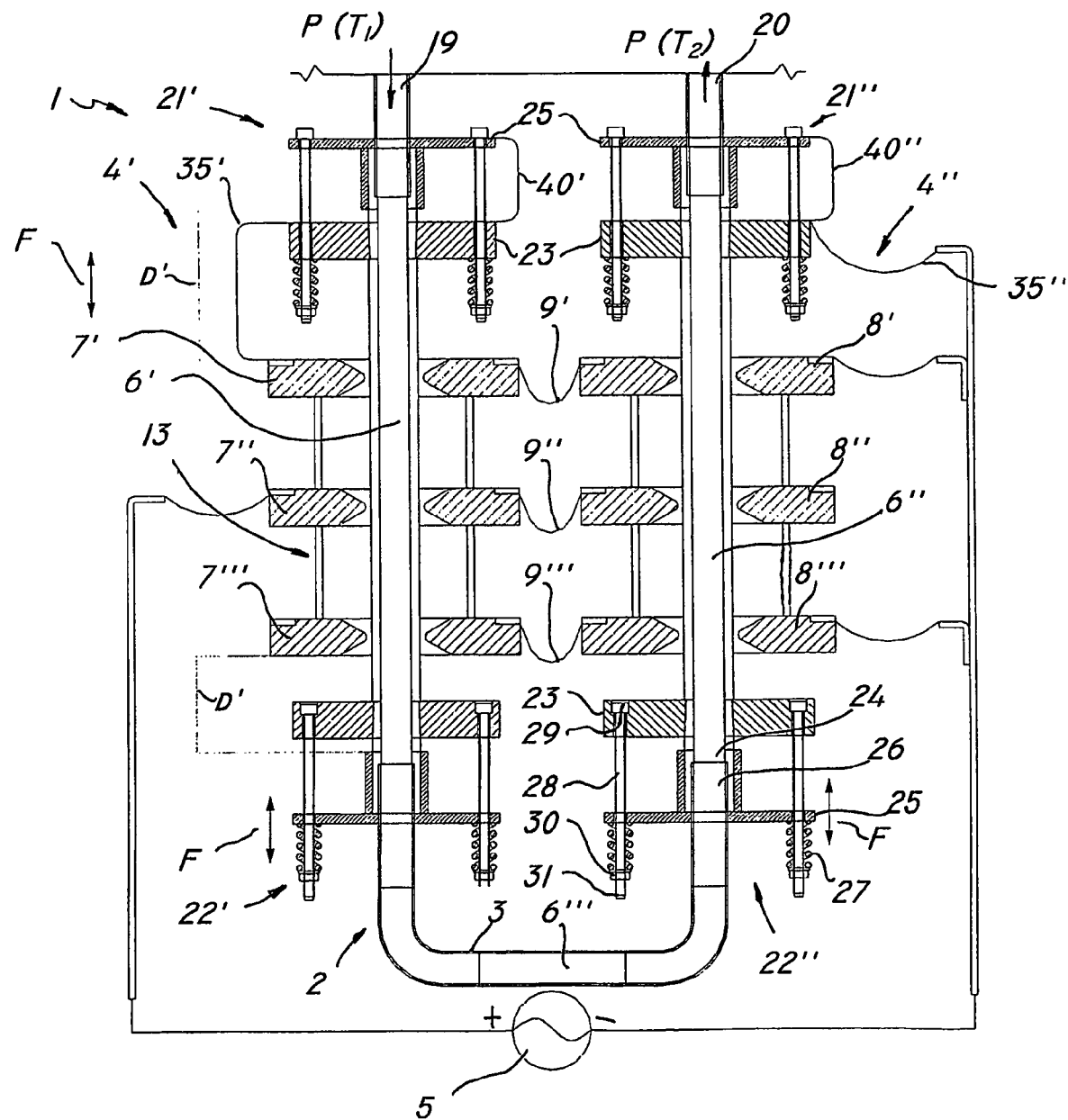
FIG. 1 is a sectional view of an apparatus according to the invention.

Referring to the above figures, the apparatus of the invention, which is generally designated by numeral 1, may be part of a plant for treating liquid, pasty, semisolid or granular products, such as milk, purees, sauces, juices, semolina, small pasta or the like.

Essentially, the apparatus 1 comprises a duct, generally designated by numeral 2, having a substantially cylindrical outer surface 3, a series of annular electrodes 4', 4" around the pipe 2 and generator means 5 for generating a high frequency oscillating voltage. In this connection, as is known, the frequencies that can be used for civil and industrial applications are typically within ranges imposed by international standards, whose central values are 6.78-13.56-27.12-40.68-433.92 MHz. By way of a non limiting example, the apparatus of the invention may operate at about 27.12 or 40.68 MHz.

As shown in FIG. 1, the duct 2, which is made of an electrically insulating material, e.g. Teflon®, is bent into a U shape to minimize size, with two substantially parallel longitudinal branches 6', 6", joined by a transverse connection length 6'''. The electrodes will necessarily be made of a conducting material, e.g. aluminum.

Each electrode series 4', 4" is associated to one respective branch 6', 6". Namely, three annular electrodes is associated to each branch 6', 6", so that the series 4' will be composed of the electrodes 7', 7", 7''' and the series 4' will be composed of the electrodes 8', 8", 8''', i.e. a total of six electrodes. The electrodes of each series 4', 4" is parallel and equally spaced, thereby forming three pairs of electrodes, one above the other. Furthermore, the adjacent electrodes is electrically connected by flexible conductors 9', 9", 9''', such as a copper foil. Thus, the electrode 7' of the series 4' is electrically connected to the electrode 8' of the series 4", 7" is connected to 8", and so on. Furthermore, the generator means 5 is electrically connected to the electrodes, namely the pairs 7'-8' and 7'''-8''' to the negative pole and the pair 7"-8" to the positive pole.

Figure 2:
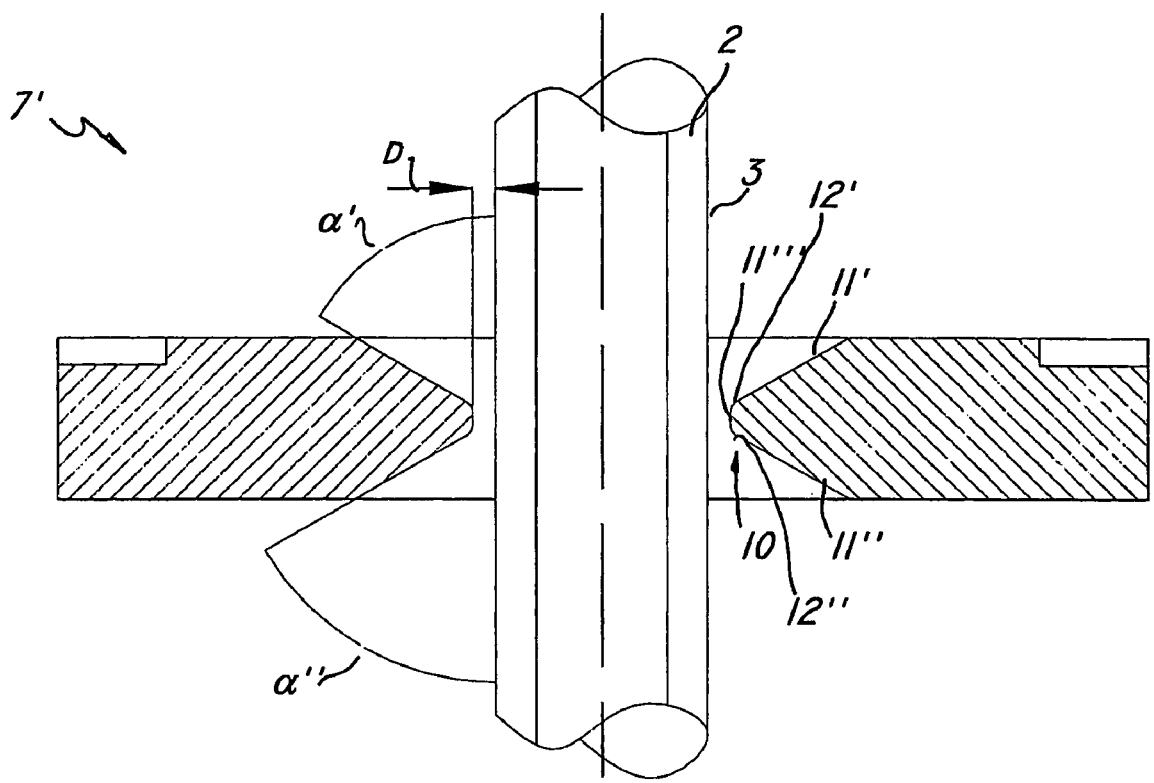
FIG. 2 is an enlarged view of a detail of FIG. 1.
Figure 3:
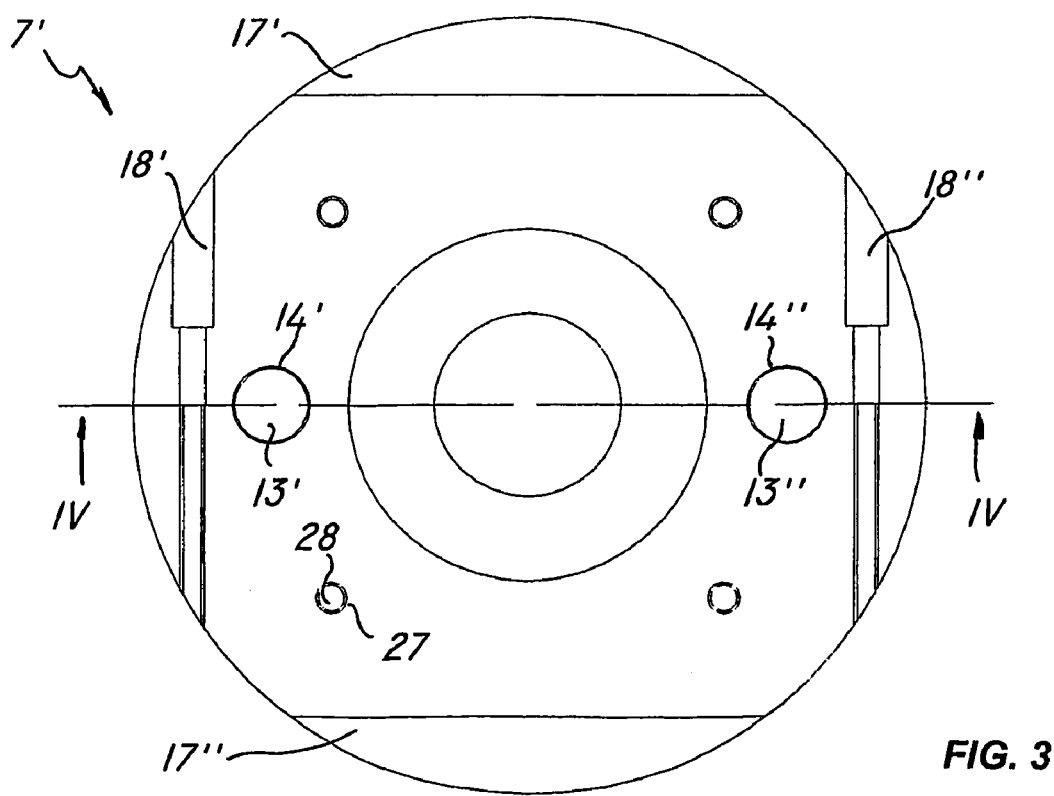
FIG. 3 is a top view of another detail of FIG. 1.
Figure 4:
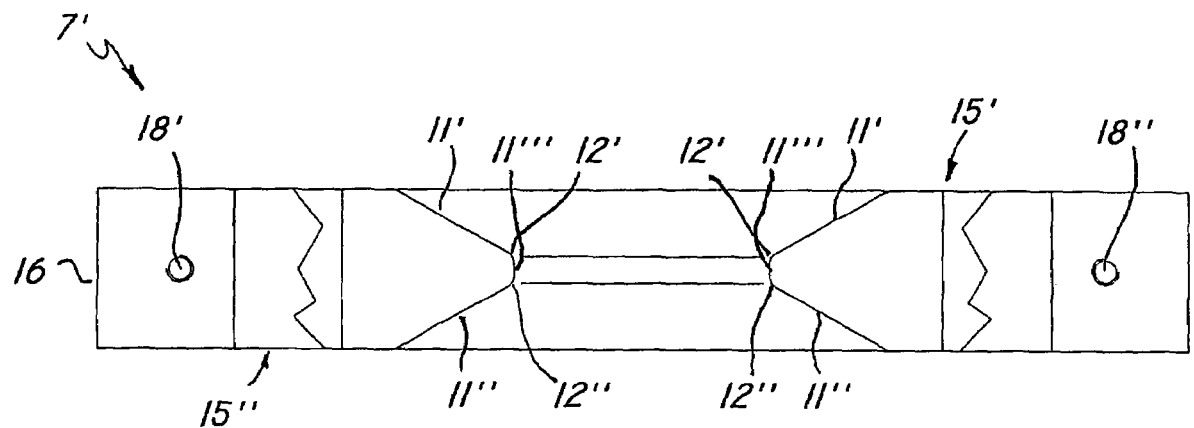
FIG. 4 shows the detail of FIG. 3, as sectioned along a plane IV-IV.
Figure 5:
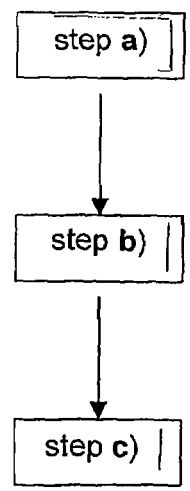
FIG. 5 shows a flowchart of a method of use of the apparatus according to the invention.

As shown in FIG. 2, each electrode has an inner surface 10 at such a minimum radial distance d from the cylindrical surface 3 as to prevent electric currents from passing to the product to be treated during operation. In FIGS. 2, 3 and 4 the electrode 7' is shown by way of illustration only, there being understood that what will be disclosed hereafter is applicable to all the electrodes.

The distance d may obviously change depending on a number of parameters, including the type of product to be treated, the flow rate, the operating temperature, the materials being used. For instance, when using a Teflon® pipe 2, an aluminum electrode 7', and sterilizing about 2000 l/h of milk at a temperature of about 150° C., this distance may be of about 5 mm.

The inner surface 10 has its inner edges with substantially conically shaped and tapered outer portions 11', 11", having opposed conicity angles α', α" and a substantially cylindrical central portion 11''', thereby providing the above mentioned advantages in terms of safety and usable power. Also, the connecting sections 12', 12" will preferably be joined with a radius of curvature of about 2 mm. For a uniform electromagnetic field to be induced, the conicity angles α', α" may be of about 60°.

As shown in FIGS. 1 to 3, for the electrodes of each series to be equally spaced, pairs of longitudinal bars 13', 13" made of an electrically insulating material, such as Teflon®, will be fitted into corresponding through holes 14', 14" of each electrode from opposite sides with respect to the plane of symmetry IV-IV.

Regarding construction, as shown in FIG. 4, each of the electrodes has two parallel, opposed planar faces 15', 15" and one substantially circular outer edge 16. Each electrode is also composed of two halves 17', 17", substantially symmetrical with respect to the plane IV-IV, which are mutually connected by screw means 18', 18".

The duct 2 is connected to the inlet and outlet pipes 19 and 20 by means of connection joints 21', 21", which are resilient in the longitudinal direction, that is, in the direction of arrow F to fit any thermal expansion of the pipe 2. Similarly, joints 22', 22" will be provided to connect the longitudinal branches 6' and 6" to the transverse branch 6'''.

The joint 21' has a disk-like member 23 which is removably connected to an end portion 24 of the longitudinal branch 6', and joined to a plate 25 that is anchored to the end portion 26 of the transverse branch 6''' by suitable elastic means. These may include a pressure spring 27 associated to a corresponding guide rod 28 having the free end 29 anchored to the member 23 and the opposite free end 30 fitted with a member 31 for locking the spring 27. The same applies to the other joints 21", 22', 22".

In use, the product P to be processed, which comes from the pipe 19 at temperature $T_1$, will pass into the duct 2 through the branches 6' and 6" and come up through 6" to the outlet pipe 20, where it will have a temperature $T_2$ higher than $T_1$, with a temperature difference or change $\Delta T$. The temperature change is caused by the oscillation of the product molecules about their equilibrium points. Such oscillation is induced by the electromagnetic field that develops between the electrodes, through which the product passes, during operation, i.e. when the electric means 5 generate the electric voltage. As is known, each electrode generates an electromagnetic field around it which, when properly addressed, is applied to the processed product to heat it from temperature $T_1$ to temperature $T_2$.

The temperature change $\Delta T$ is a function of various parameters, mainly the nature of the product to be treated and its flow rate. The applicator apparatus of the invention has such an arrangement of electrodes as to allow application of electromagnetic fields with a specific power $W_{max}$ up to 200 KW per linear meter of pipe 2 with no risk of discharges to air. This value $W_{max}$ is reached using all the above geometric parameters, particularly the distance d, the shape of the electrodes, mutual positioning thereof, the conicity angles α', α" of the edge 11, as well as its chamfer and/or radius of curvature.

As an illustrative example, if an electromagnetic field having the above mentioned power per unit of length is applied to 7000 l/h of water, it will cause a temperature change $\Delta T$ of about 12-13° C.

Another important parameter for construction is the distance d' between the connection joints 21', 21" and 22', 22" and the electrodes that are closest thereto, i.e. 7', 8' and 7''' and 8''' respectively, which has to be adequately sized to prevent discharges to air during normal operation of the apparatus, thence preventing any risk of structural collapse. By way of illustration, such distance d' should not be less than about 100 mm.

The above disclosure clearly shows that the applicator apparatus of the invention fulfills the proposed objects and particularly the object of providing an apparatus whereby an end product of excellent organoleptic quality may be obtained. By forming each of the electrodes with a substantially annular shape, with an inner surface 10 having a minimum radial distance d from the outer cylindrical surface 3 of the pipe 2, which is sufficient to prevent electric currents from passing to the product to be treated during operation, the product can be heated by molecular oscillation only, thereby affording all the above mentioned advantages.

By forming the inner surface 10 with at least one substantially conical edge 11' having a predetermined conicity angle, the apparatus of the invention uses relatively high voltages with no risk of discharges to air, in a very simple and safe manner.

The apparatus of this invention is susceptible to a number of modification and changes falling within the inventive scope of the appended claims. All the details thereof may be replaced by other technically equivalent parts, and the materials may vary depending on different needs, without departure from the scope of the invention.

While the apparatus has been described with particular reference to the accompanying figures, the numerals referred to in the disclosure and claims are only used for the sake of a better intelligibility of the invention and shall not be intended to limit the claimed scope in any manner.

The invention claimed is:

1. An apparatus for applying oscillating magnetic fields, particularly for treating a liquid, pasty, semi-solid or granular product, comprising:
   at least one pipe conveying the product to be treated, said pipe having an inner surface in contact with the product and a substantially cylindrical outer surface;
   at least one series of electrodes located around the outer surface of said at least one pipe, each of said electrodes having a substantially annular shape and an inner surface with at least one substantially conical edge having a predetermined conicity angle; and
   a generator of high-frequency oscillating voltage, the generator having a negative terminal and a positive terminal electrically connected to said at least one series of electrodes to generate an electromagnetic field therebetween,
   wherein each pipe comprises an electrically insulating material to prevent passage of current to the product, said high-frequency oscillating voltage being in the range of radio-frequency, said inner surface of each said electrode being out of contact with the product to be treated and having a minimum radial air distance from the outer cylindrical surface of said at least one pipe which is sufficient to prevent electric currents from passing to the product to be treated, during operation, and which is further sufficient to heat the product exclusively via oscillation of product molecules about their equilibrium points induced by said oscillating electromagnetic field, and wherein each pair of longitudinally adjacent electrodes has facing conical edges with opposed conicity angles and is connected to terminals of said generator having opposite signs to induce electromagnetic field lines substantially parallel to a longitudinal axis of the pipe and to allow use of high-frequency currents with no risk of discharges to air.

2. The apparatus as claimed in claim 1, wherein each of said annular electrodes has two substantially conical inner edges having opposed conicity angles.

3. The apparatus as claimed in claim 1, wherein the annular electrodes of each series are substantially parallel and equally spaced.

4. The apparatus as claimed in claim 1, wherein each of said annular electrodes has a pair of substantially parallel planar opposed faces and one substantially circular outer edge.

5. The apparatus as claimed in claim 1, wherein said minimum radial distance is comprised between 2 mm and 8 mm.

6. The apparatus as claimed in claim 1, wherein said predetermined conicity angle ($\alpha'$, $\alpha''$) is of 45° to 80°.

7. The apparatus as claimed in claim 1, wherein said inner annular edge has a substantially cylindrical central portion interposed between said substantially conical edges.

8. The apparatus as claimed in claim 7, wherein connection areas between said substantially cylindrical portion and said substantially conical edges are joined with a radius of curvature of 1.5 mm to 3 mm.

9. The apparatus as claimed in claim 1, wherein said electrodes are arranged to provide an application of electromagnetic fields up to 200 kW per linear meter of pipe with no risk of discharges to air.

10. The apparatus as claimed in claim 1, further comprising at least one insulating spacer member maintaining the electrodes of each array in equally spaced positions.

11. The apparatus as claimed in claim 1, wherein each of said annular electrodes comprises two halves substantially symmetrical with respect to an axial longitudinal plane, the two halves being mutually connected by screw means.

12. The apparatus as claimed in claim 11, further comprising a plurality of pairs of electrically insulating longitudinal bars, each of the pairs of bars being fitted in corresponding through holes one of the electrodes from opposite sides with respect to said axial longitudinal plane.

13. The apparatus as claimed in claim 1, wherein said pipe has at least one pair of substantially longitudinal branches, which are substantially parallel and adjacent, and which are joined by at least one substantially transverse connection branch.

14. The apparatus as claimed in claim 13, wherein a series of annular electrodes is associated to each of said substantially longitudinal branches.

15. The apparatus as claimed in claim 14, wherein the electrodes a first series associated to one of said substantially longitudinal branches are substantially coplanar to corresponding adjacent electrodes of a second series associated to an adjacent longitudinal branch.

16. The apparatus as claimed in claim 13, wherein the electrodes of adjacent series are electrically interconnected by flexible conductors to fit a thermal expansion of their respective branches.

17. The apparatus as claimed in claim 13, wherein each series of electrodes comprises at least two end electrodes electrically connected to the negative terminal of said generator and at least one third annular electrode interposed between the two end electrodes, the third electrode being electrically connected to the positive terminal of said generator.

18. The apparatus as claimed in claim 13, wherein said at least one pipe is connected to one or more of an inlet and outlet pipe and to said transverse branch by one or more connection joints which is longitudinally resilient to fit a thermal expansion of said at least one pipe.

19. The apparatus as claimed in claim 18, wherein each of said one or more connection joints has a disk shaped member which is removably connected to an end portion of a respective longitudinal branch, and joined to a plate that is anchored to corresponding end portions of said transverse branch by suitable elastic means.

20. The apparatus as claimed in claim 19, wherein said elastic means include a pressure spring associated to a corresponding guide rod having one free end anchored to said disk-shaped member and an opposite free end fitted with a member locking said pressure spring.

21. The apparatus as claimed in claim 18, wherein said connection joints are at a sufficient distance from said electrodes to prevent discharges to air during normal operation.

22. The apparatus as claimed in claim 21, wherein said distance is of more than 100 mm.

23. A system for applying oscillating magnetic fields, particularly for the treatment of a liquid, pasty, semi-solid or granular product, comprising:
   a tank for the product to be treated;
   means for heating the product; and
   means for conveying the product from said tank to said heating means,
   wherein said heating means comprise an apparatus for applying oscillating electromagnetic fields, comprising:
   at least one pipe conveying the product to be treated, said pipe having an inner surface in contact with the product and a substantially cylindrical outer surface;
   at least one series of electrodes located around the outer surface of said at least one pipe, each of said electrodes having a substantially annular shape and an inner surface with at least one substantially conical edge having a predetermined conicity angle;
   a generator of high-frequency oscillating voltage having a negative terminal and a positive terminal, which are electrically connected to said at least one series of electrodes to generate an electromagnetic field therebetween;
   wherein each pipe is made of an electrically insulating material to prevent passage of current to the product, said high-frequency oscillating voltage being in the range of radio-frequency, said inner surface of each said electrode being out of contact with the product to be treated and having a minimum radial air distance from the outer cylindrical surface of said at least one pipe which is sufficient to prevent electric currents from passing to the product to be treated, during operation, and which is further sufficient to heat the product exclusively via oscillation of product molecules about their equilibrium points induced by said oscillating electromagnetic field, and
   wherein each pair of longitudinally adjacent electrodes has facing conical edges with opposed conicity angles and is connected to terminals of said generator having opposite signs to induce electromagnetic field lines substantially parallel to a longitudinal axis of the pipe and to allow use of high-frequency currents with no risk of discharges to air.

24. A method of applying oscillating magnetic fields for treating a product, the method comprising the following steps:
- conveying the product to be treated into at least one essentially tubular pipe;
- providing a series of annular electrodes located around an outer periphery of said at least one pipe, wherein each of said electrodes has a substantially annular shape and an inner surface with at least one substantially conical edge with a predetermined conicity angle; and
- providing a generator of high-frequency oscillating voltage, the generator having a negative terminal and a positive terminal electrically connected to said annular electrodes to generate an oscillating electromagnetic field to be applied to said product;
- wherein said at least one essentially tubular pipe comprises an electrically insulating material, said high-frequency oscillating voltage being selected in the range of radio-frequency, the product to be treated being conveyed along said pipe while keeping the inner annular surface of said electrodes out of contact with the product to be treated and at a minimum radial air distance therefrom to prevent electric currents from passing to the product to be treated, during operation, and to heat the product via oscillation of product molecules caused by said oscillating electromagnetic field only, and
- wherein each pair of longitudinally adjacent electrodes is arranged with facing conical edges having opposed conicity angles and is connected to terminals of said generator having opposite signs to induce electromagnetic field lines substantially parallel to a longitudinal axis of the pipe and to allow use of relatively high voltages with no risk of discharges to air.

* * * * *